United States Patent
Wise (10) Patent No.: US 9,209,985 B1
(45) Date of Patent: Dec. 8, 2015

(54) ASSOCIATION OF DIVERSE APPLICATION LOGIC ACROSS MULTIPLE DISTINCT DEVICES WITH PRIORITY BANDWIDTH CHANNEL

(71) Applicant: MTN Satellite Communications, Seattle, WA (US)

(72) Inventor: Robert M Wise, Issaquah, WA (US)

(73) Assignee: MARITIME TELECOMMUNICATIONS NETWORK INC., Mlramar, FL (US)

( * ) Notice: Subject to any disclaimer, the term of this patent is extended or adjusted under 35 U.S.C. 154(b) by 0 days.

(21) Appl. No.: 14/327,456

(22) Filed: Jul. 9, 2014

Related U.S. Application Data (63) Continuation of application No. 14/170,523, filed on Jan. 31, 2014.

(60) Provisional application No. 61/759,273, filed on Jan. 31, 2013, provisional application No. 61/759,306, filed on Jan. 31, 2013.

(51) Int. Cl.
*H04L 12/14* (2006.01)
*H04W 4/24* (2009.01)
*H04W 72/04* (2009.01)

(52) U.S. Cl.
CPC ............. *H04L 12/1489* (2013.01); *H04W 4/24* (2013.01); *H04W 72/0493* (2013.01)

(58) Field of Classification Search
CPC ... H04W 84/005; H04W 84/06; H04W 84/18; H04W 4/24; H04W 72/0493; H04L 12/1489
See application file for complete search history.

(56) References Cited

U.S. PATENT DOCUMENTS

| | | | |
|---|---|---|---|
| 8,848,608 B1 * | 9/2014 | Addepalli et al. ............ 370/328 |
| 2003/0079043 A1 * | 4/2003 | Chang et al. ................... 709/249 |
| 2007/0047491 A1 * | 3/2007 | Dutta et al. ..................... 370/331 |
| 2007/0087756 A1 * | 4/2007 | Hoffberg ....................... 455/450 |
| 2008/0042912 A1 * | 2/2008 | Lee .................................. 343/713 |
| 2010/0304737 A1 * | 12/2010 | Jain et al. ................... 455/426.1 |
| 2013/0041573 A1 * | 2/2013 | Ochi ............................. 701/117 |
| 2013/0070751 A1 * | 3/2013 | Atwal et al. ................... 370/350 |
| 2014/0137080 A1 * | 5/2014 | Huang et al. .................. 717/121 |
| 2015/0168174 A1 * | 6/2015 | Abramson et al. ............ 701/408 |

* cited by examiner

*Primary Examiner* — Jianye Wu
(74) *Attorney, Agent, or Firm* — FSP LLC (57) ABSTRACT

A process for modifying application logic includes establishing a communication connection between the application logic or passenger devices aboard a moving vessel, and control logic aboard the moving vessel. The control logic monitors factors affecting latency of communications to or from the application logic to a network external to the vessel. Features of the application logic are modified to change between free to use and a payment model for use, according to the factors affecting latency. The feature modifications made only to particular application logic of a group of associated application logic on multiple passenger devices.

19 Claims, 8 Drawing Sheets

ASSOCIATION OF DIVERSE APPLICATION LOGIC ACROSS MULTIPLE DISTINCT DEVICES WITH PRIORITY BANDWIDTH CHANNEL

CROSS REFERENCE TO RELATED APPLICATIONS

This applications claims priority and benefit under 35 U.S.C. 119 to U.S. application Ser. No. 61/759,273, filed on Jan. 31, 2013, and under 35 U.S.C. 119 to U.S. application Ser. No. 61/759,306 filed on Jan. 31, 2013, each of which is incorporated herein by reference in its entirety.

BACKGROUND

Moving vessels may provide data connectivity to the global Internet, or to private networks, from remote locations through which the vehicle may travel. Satellite connections may be utilized for these remote data connections. Satellite connections have lower bandwidth than other network access technologies such as cable modem, fiber optics, or digital subscriber line. Satellite connects may also suffer slowdowns or outages due to weather conditions. This may inhibit certain types of communication from the vessel, and may cause application logic on passenger data processing devices to execute slowly, or with unreliable performance.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones.

Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

The following terminology and acronyms may be used in the description which follows:

(CIR) in this context refers to Committed Information Rate—the guaranteed minimum amount of bandwidth committed to a customer, application or remote site (MIR) in this context refers to Maximum Information Rate—the maximum amount of bandwidth allocated to a customer, application or remote site based on availability and not guaranteed (Bandwidth Pool) in this context refers to a specific segment of bandwidth that is typically shared between multiple customers, sites or ships in a region.

(VSAT) in this context refers to Very Small Aperture Terminal (CBM) in this context refers to Central Bandwidth Manager—located in a central data center (LSS) in this context refers to Local Service Selector—located on individual vessels, remote sites or vehicles (NMS) in this context refers to Network Management System (MCP) in this context refers to Mobile Communications Platform (includes ships, land vehicles (trucks, trains, cars . . . ), and aircraft)

(Shore side) in this context refers to any fixed (non-mobile) location in the area of an MCP.

(ship) in this context refers to a vessel that moves on or under the water. Although discussed in the context of a ship, the invention is applicable to other vehicles such as trains, busses, or planes.

(antenna) in this context refers to a physical device that facilitates the transmission and reception of radio waves. The size and shape of the antenna is designed according to the frequency and possibly other characteristics of radio waves or signal being communicated. Antennas are used in systems such as radio and television broadcasting, point-to-point radio communication, wireless LAN, mobile phones, radar, and satellite communication. The size and shape of an antenna is carefully designed and tuned to the characteristics of radio wave being transmitted and received.

(wireless) in this context refers to the transmission and/or reception of signals "without wires", i.e. communication without any wireline connections between the sender and the receiver. Wireless communications involves using the radio frequency spectrum (airwaves) and electromagnetic signaling logic to transmit information.

(store and forward) in this context refers to a telecommunications technique in which information is transmitted to an intermediate station where it is stored and transmitted at a later time to the final destination or to another intermediate station. The intermediate station, or node in a networking context, may verify the integrity of the message before forwarding it. This technique may be used in networks with intermittent connectivity, especially in isolated environments or those requiring high mobility. It may also be useful in applications when there are long delays in transmission and variable and high error rates, or if a direct, end-to-end connection is not available.

(relay) in this context refers to an electronic device that receives a signal and retransmits it at a higher level or higher power, or onto the other side of an obstruction, so that the signal can cover longer distances.

(uplink) in this context refers to signaling going in the direction from a device (such as a computer or phone) to a network, server, or satellite. A two-way (bi-directional) connection generally contains both an uplink and downlink connection. In the context of satellite communications, an uplink is the earth-to-satellite microwave link and related components such as earth station transmitting equipment. The satellite contains an uplink receiver. Various uplink components in the earth station are involved with the processing and transmission of the signal to the satellite.

(file) in this context refers to an organization of machine memory including physical partitioning bounding the file contents and distinguishing the file contents from the contents of other areas of the memory, including other files. The file typically configures the machine memory so that an operating system or BIOS can access the file contents using an identifier, which is often a human-readable sequence of symbols (the file name)

(timer) in this context refers to logic that measures elapsed time or a time interval (WAP) in this context refers to (wireless access point) a device that makes a wireless interface to a network available to client devices. Examples of wireless network access points are WiFi "hotspots" and 3G and 4G cellular hotspots a wireless access point, a device or system including radio transceivers that convert digital information to and from radio signals that can be exchanged with other wireless communication devices. The most basic forms of wireless access points simply for wireless connections. A wireless access point that includes the ability of DHCP and network address translation (NAT) is typically called a wireless gateway.

(bandwidth) in this context refers to Bandwidth is used to measure the data throughput of a channel or connection. It's the amount of data that can be sent over a connection in a given amount of time without distortion. It should not be confused with band. The width or capacity of a communications channel. Analog bandwidth is measured in Hertz (Hz) or cycles per second. The actual bandwidth size is the difference between the lowest and highest frequency in the band, which determines how much information can be transmitted at once. Digital bandwidth is the amount or volume of data that may be sent through a channel, measured in bits per second, without distortion. Bandwidth should not be confused with the term band, such as a wireless phone that operates on the 800 MHz band. Bandwidth is the space it occupies on that band. The relative importance of bandwidth in wireless communications is that the size, or bandwidth, of a channel will impact transmission speed. Lots of data flowing through a narrow channel takes longer than the same amount of data flowing through a broader channel.

(internet) in this context refers to a global system of interconnected computer networks that use the standard Internet protocol suite (TCP/IP) to serve several billion users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW), the infrastructure to support email, and peer-to-peer networks.

(satellite) in this context refers to An object that revolves around another object of greater mass (such as the earth) and has a motion that is determined by the force of attraction (gravity) of the larger object. (2-communications) A space vehicle that orbits the earth which contains one or more radio transponders that receive and retransmit signals to and from the earth. (3-equipment) A piece of equipment or system that operates at a remote location from a central control system.

(platform) refers to a data facility remotely located and lacking a high speed wired interface to a WAN.

(application server) in this context refers to logic that provides resources to execute applications and makes features of those applications available to client devices over a network communication channel.

(application) in this context refers to Also, logic that causes a computer to perform tasks beyond the basic operation of the computer itself. The term "application" may be abbreviated in some contexts to simply "app". An application may be logic built upon or integrated with operating system logic. Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming. (Operating system (logic)) in this context refers to (ASIC) in this context refers to Application-specific integrated circuit (audio) in this context refers to a representation of sound within a device or a physical storage or communication media, typically as either analog or digital signals (BIOS) in this context refers to (Basic Input/Output System), also known as System BIOS, ROM BIOS or PC BIOS is a definition of an interface to input and output devices of a machine. The BIOS are typically initializes and tests the machine I/O components, and loads a bootloader or an operating system from a mass memory device. The BIOS additionally provides abstraction layer for the hardware, i.e. a consistent way for application programs and operating systems to interact with the keyboard, display, and other input/output devices. Variations in the system hardware are hidden by the BIOS from programs that use BIOS services instead of directly accessing the hardware. Many operating systems ignore the abstraction layer provided by the BIOS and access the hardware components directly. The Unified Extensible Firmware Interface (UEFI) is a specification that defines a software interface between an operating system and platform firmware. UEFI is meant to replace the Basic Input/Output System (BIOS) firmware interface.

(bridge) in this context refers to logic to enable two or more communication networks, or two or more network segments, to create an aggregate network. Bridging is distinct from routing which allows the networks to communicate independently as separate networks. A network bridge is a network device that connects multiple network segments.

(browser) in this context refers to logic that is operated by a device to access content and logic provided by Internet sites over a machine network. Browser logic provides a human-friendly interface to locate, access, utilize, and display content and logic encoded by web sites or otherwise available from servers of a network (such as the Internet).

(bus) in this context refers to a collection of coordinated conductors through which data is transmitted from one part of a device to another. You can think of a bus as a highway on which data travels within a computer. The term bus may refer to an internal bus, a bus that connects all the internal computer components to the CPU and main memory. There's also an expansion bus that enables expansion boards to access the CPU and memory. Types of internal busses are the address bus and the data bus. The data bus transfers actual data whereas the address bus transfers information about where the data is located in machine memory. There are also external busses such as USB and Firewire. The size of a bus, known as its width, is important because it determines how much data can be transmitted at one time. For example, a 16-bit bus can transmit 16 bits of data, whereas a 32-bit bus can transmit 32 bits of data. Every bus has a clock speed. A fast bus allows data to be transferred faster, which makes applications run faster.

(cellular network) in this context refers to (mobile network) logic implementing a radio network distributed over land areas called cells, each served by at least one fixed-location transceiver, known as a cell site or base station. In a cellular network, each cell uses a different set of frequencies from neighboring cells, to avoid interference and provide guaranteed bandwidth within each cell. When joined together these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

(client device) in this context refers to any machine that interfaces to a machine network to obtain resources from one or more server systems.

(communication address) in this context refers to a machine code that may be applied to affect machine network routing logic to communicate signals from one machine to another across the network.

(CPU) in this context refers to (Central Processing Unit), an electronic circuit that operates as a main and general purpose execution component for device logic.

(database server) in this context refers to one or more server machines that provide storage and access (queries against) database(s) on behalf of client devices.

(database) in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

(display) in this context refers to A output device for visual information. Display technologies, esp. for mobile devices, may include CSTN, TFT, TFD or OLED. There are also types of touchscreen displays, e.g. capacitive and resistive.

(DSP) in this context refers to (Digital Signal Processor)

(email) in this context refers to a form of electronic or optical communications between devices, which takes the form of exchanging messages from an author to one or more recipients. Email communications typically operates across the Internet or other device networks (FPGA) in this context refers to field programmable gate array (gateway) in this context refers to a network device that serves as an interface to another network. Within enterprises, the gateway routes traffic from an internal network (e.g., LAN) to a wide area network such as the Internet. In homes, the gateway may be provided by the ISP that connects the home to the Internet. In enterprises, the gateway node often acts as a proxy server and a firewall.

(hard disk) in this context refers to hard drive.

(HTML) in this context refers to HyperText Markup Language, a standard markup language used to define web pages on the Internet for viewing and interaction with web browsers (IP) in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices. IP is the the protocol used for communicating data across a packet-switched network used in most publicly accessible networks today. Connections that mobile devices make to GPRS, 3G and similar networks are made using IP.

(keypad) in this context refers to a device including an arrangement of buttons or keys, to act as switches each associated with a symbol. Pressing or activating a key inputs the associated character to an attached device.

(LAN) in this context refers to logic implementing a network that interconnects computers and devices in a defined area such as a home, school, computer laboratory, or office building. LANs, in contrast to wide area networks (WANs), include usually higher data-transfer rates, smaller geographic area, and lack of a need for leased telecommunication lines. Ethernet over twisted pair cabling, and Wi-Fi (Wireless LANs, or WLANs) are two common technologies currently used to build LANs.

(load balancing) in this context refers to a resource cluster and associated logic for distributing workloads across multiple components or communication links. Load balancing may attempt to optimize resource utilization in an even fashion, maximize throughput, minimize response time, and avoid overloads. Because it utilizes multiple components, load balancing may increase reliability through redundancy.

(media) in this context refers to objects on which data can be stored. These include hard disks, floppy disks, CD-ROMs, and tapes. (2) In computer networks, media refers to the cables linking workstations together. There are many different types of transmission media, the most popular being twisted-pair wire (normal electrical wire), coaxial cable (the type of cable used for cable television), and fiber optic cable (cables made out of glass). (3) The form and technology used to communicate information. Multimedia presentations, for example, combine sound, pictures, and videos, all of which are different types of media.

(memory) in this context refers to a device having a machine interface and storing data in the form of an altered material/energy configuration. Two common types of device memory are SAM, or Sequential Access Memory and RAM, or Random Access Memory. Data on SAM devices is read and written in a sequence, while data on a RAM device is read or written in any order. Examples of SAM devices include CD-ROMS and magnetic tape. RAM devices include flash drives and solid state hard drives. RAM is usually faster than SAM. Other examples of device memory are hard drives, flash drives, optical discs and RAM chips.

(mobile device) in this context refers to any device that includes logic to communicate over a machine network and having a form factor compatible with being carried conveniently by a single human operator. Mobile devices typically have wireless communications capability via WAPs or cellular networks.

(modem) in this context refers to (modulator-demodulator) a device that modulates a carrier signal to encode digital information, and also demodulates such a carrier signal to decode the transmitted information.

(OS) in this context refers to logic that manages device hardware resources and provides common services for application logic. The operating system is a component of many devices, such as computers and mobile phones. Application logic usually requires an operating system in order to function. Operating systems typically manage utilization of device resources, such as I/O devices, displays, processor utilization, memory, mass storage, and printing. The operating system acts as an intermediary between applications and the hardware resources, although applications are often (though not always, in the case of virtual machines) executed directly by the device hardware (e.g., one or more CPUs) and will frequently make system calls to the operating system, or be interrupted by it. Operating systems can be found on almost any device that contains a programmable processor or controller, from cellular phones and video game consoles to supercomputers and web servers.

(processor) in this context refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine.

(RAM) in this context refers to (Random-Access Memory) a type of memory that is fast relative to other (e.g., nonvolatile) memory is a device, but is volatile, meaning stored information is lost when electric power is removed. RAM is also typically freely addressable, meaning addressability is not constrained to block or sequential access. For these reasons, it is useful only for temporary storage of data that requires fast access. A device will typically have RAM and some kind non-volatile memory to store a copy of all logic (i.e., 'code' and 'data') that needs to be maintained when the device is powered off or that specific logic is not executing on the device. Both the OS and application software typically use RAM.

(RF) in this context refers to (radio frequency) a rate of oscillation in the range of about 3 kHz to 300 GHz, which corresponds to the frequency of electromagnetic radio waves, and the alternating currents which carry radio signals. RF usually refers to electrical rather than mechanical oscillations, although mechanical RF systems do exist Radio FrequencyRF can refer to anything related to radio signals, which are invisible electromagnetic waves created by applying a pulsing electric current to an antenna. "RF" generally refers to the radio waves themselves, or systems that handle radio signals directly, such as the circuits connected directly to the antenna. Technically, RF is the 10 kHz to 300 GHz frequency range of the electromagnetic spectrum that can be used for wireless communication known as radio.

(ROM) in this context refers to device memory containing data that normally can only be read, not written to. Unlike a computer's random access memory (RAM), the data in ROM is not lost when the computer power is turned off. The data on the ROM can usually be loaded into the RAM if needed. "Read-only memory" may in fact be writable memory, but the process of writing data is comparatively slow and infrequent as compared to RAM, and often does not permit the addressing flexibility that RAM does.

(router) in this context refers to logic that distributes digital information that is contained within a data packet. Each data packet contains address information that a router can use to determine if the source and destination are on the same network, or if the data packet must be transferred from one network to another. This transfer to another type of network is achieved by encapsulating the data with network specific protocol header information. When multiple routers are used in a large collection of interconnected networks, the routers exchange information about target system addresses, so that each router can build up a table showing the preferred paths between any two systems on the interconnected networks.

(sensor) in this context refers to a device or composition of matter that responds to a physical stimulus (as heat, light, sound, pressure, magnetism, or a particular motion) and transmits a resulting impulse (as for measurement or operating a control)

(server) in this context refers to logic designed to respond to requests for functionality from client logic that interacts with the server logic via a request/response model, often over a network. Thus, the server performs some operation utilizing the underlying resources of the device or devices hosting the server, on behalf of clients (request submitters). The client logic either executes on the same device or devices as the server logic, or interacts with the server logic through a machine data network.

(WAN) in this context refers to (Wide Area Network) a network that provides data communications to a larger number of users than are usually served by a local area network (LAN) and is usually spread over a larger geographic area than that of a LAN. Logic implementing a network that covers a broad area (e.g., a telecommunications network that links across metropolitan, regional, or national boundaries) using private or public network transports. Business and government entities utilize WANs to relay data among employees, clients, buyers, and suppliers from various geographical locations. The Internet can be considered a WAN.

(web server) in this context refers to a device or device system that delivers web pages in response to requests for the web pages from web browsers. Also, logic to communicate web pages at the request of clients, most typically using the Hypertext Transfer Protocol (HTTP). The server communicates HTML documents and any additional content that may be included by a document, such as images, style sheets and scripts, as well as content referenced by certain types of links (pointers) in the web pages. A user agent, commonly a web browser or web crawler, initiates communication with the web server by making a request for a resource using (typically) HTTP, and the server responds with the content of that resource or an error message if unable to do so. The resource is typically a file on the server's secondary storage, but this is not necessarily the case. Many web servers have a capability of receiving content from clients. This feature is used for submitting web forms, including uploading of files.

(WiFi) in this context refers to logic (also spelled Wi-Fi) that allows an electronic device to exchange signals with another device wirelessly using radio waves. The term may refer to any logic that the Institute of Electrical and Electronics Engineers' (IEEE) 802.11 standards". The term "Wi-Fi" may thus be used as a synonym for "WLAN". A device comprising Wi-Fi capability can connect to a network resource such as the Internet via a wireless network access point. One variant of Wi-Fi is 802.11g, which is capable of providing speeds of up to 54 Mbps and is backwards compatible with 802.11b (providing up to 11 Mbps). There is currently a new standard in the works called 802.11n (offering twice the speeds of 802.11b) and there are already retail networking devices that support its draft specifications. Wi-Fi is typically faster than technologies operating through the cellular network like GPRS, EDGE and even UMTS and HSDPA.

Overview

A moving vessel includes a data processing system having logic adapted to associate a group of distinct and disparate application logic on different passenger devices with a single account aboard a moving vessel, and to allocate priority bandwidth on a satellite access channel from the vessel to a machine network external to the vessel, and to associate the priority bandwidth exclusively with the group of applications, and to allocate availability of the priority bandwidth among applications within the group depending on application activity while aboard the moving vessel.

Each distinct application logic may be identified by a device identifier and an application identifier, or simply by a unique application identifier (uniquely generated for the application and the device it is installed upon, for example). The priority bandwidth may be allocated entirely to one application of the group based upon existing or predicted connectivity circumstances for the vessel, or allocated pro-rata to all applications of the group based upon existing or predicted connectivity circumstances for the vessel, or allocated pro-rata to a defined subset of applications of the group based upon existing or predicted connectivity circumstances for the vessel.

The system may include logic adapted to subject one or more of the applications of the group to feature modifications based on available or predicted bandwidth for the vessel. It may subject only those applications of the group associated with certain passenger devices to feature modifications based on available or predicted bandwidth for the vessel.

DESCRIPTION

Logic aboard MCP data processing system, e.g. an LSS, is configured to associate a group of distinct and disparate application logic with a single passenger account. The disparate application logic is physically installed and located on multiple distinct data processing devices, each of which is physically distinct from the other and capable of being separately moved and located and operated. For example, the disparate devices may include multiple cell phones and multiple laptop computers, as well as music players and other portable data processing devices, all associated with a single passenger account, or a group account for a number of passengers (e.g., a family account, a corporate account, etc.). Each distinct application logic may be identified by a device identifier and an application identifier, or simply by a unique application identifier (uniquely generated for the application and the device it is installed upon, for example). Priority bandwidth on a limited bandwidth access channel, such as a wireless connection from the vessel to a satellite, and from there to the global Internet, or a corporate LAN, is associated with the group of applications. The group of applications may share the priority bandwidth channel or the priority bandwidth channel may "move" among applications depending on their need and/or activity and/or usage. The MCP logic may intelligently allocate or assign the high bandwidth connection or a pro-rata portion of the high bandwidth connection to one application, or a subset of the applications, or all of the applications based upon MCP and latency circumstances (for examples of such circumstances, see below).

The group of applications may be subject to feature modifications as described below. Some or all of the applications in the group, or only applications associated with certain devices, may be affected by the modifications. The high-bandwidth channel with which the application group is associated may be assigned to certain application features, and these features may migrate from a free access model to a payment model, as described below.

Logic on a data processing device is adapted into an application. An application is logic that may be invoked by a user of the device and which provides an interface with which the user may interact to control the devices' actions. The interface of the application and the features and functions it makes available to the user may adapt and change according to the location or circumstances of an MCP. The adaptation may take the form of adding or removing features of the application user interface, and/or making certain features and functions accessible through the user interface free of charge, pay per use or pay by data bandwidth the features will require, or predicted bandwidth conditions for the MCP. The MCP may provide the application with an Internet connection that is wireless between the vessel and a satellite, or some other wireless connection technology, but preferably a satellite connection. The satellite connection may be supplemented or replaced at times by one or more WiFi connection(s).

In one embodiment, a determination is made as to whether a free feature of application logic becomes pay per use, pay per unit bandwidth, or another payment-based model, based upon the determination of how much bandwidth the feature will require, and/or other factors such as a length of a queue for outbound bandwidth on the MCP. In some embodiments, features of the applications may be disabled or removed according to similar factors. The connectivity circumstances of the MCP as described below may also be factors.

Figure 1:
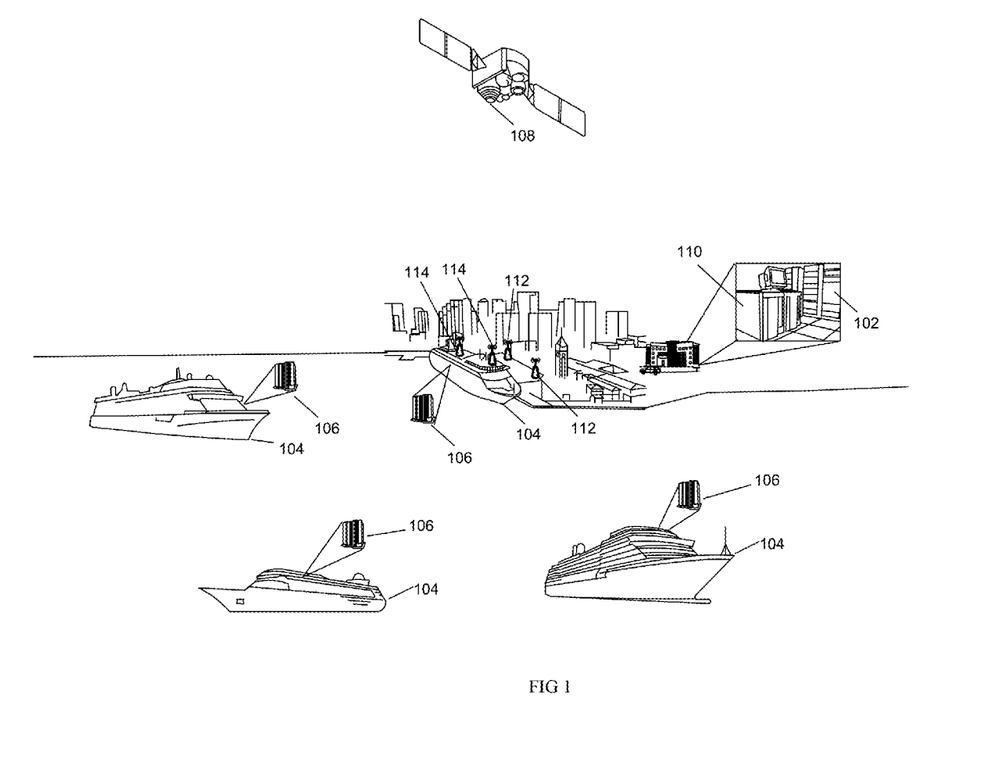
FIG. 1 illustrates an embodiment of a mobile communication platform, operating environment, and system.

Referring to FIG. 1, bandwidth allocation and connection setup for MCPs 104 utilizing satellite 108 communications is managed and controlled by two independent but cooperating systems. They are:

1) Central Bandwidth Manager (CBM) 102
2) Local Service Selectors (LSS) 106 that are mobile and located on each MCP 104

The CBM 102 is responsible for the overall monitoring and control of the bandwidth/connection allocation process. The CBM 102 interfaces with various Network Management Systems 110 (like the iDirect NMS), to obtain real-time bandwidth allocation and utilization data at the network, MCP 104 and application levels. The CBM 102 also interfaces with the LSSs 106 on each MCP 104 to determine the status of the connectivity options available to each MCP. The LSS 106 is responsible for making local routing decisions based on real-time connectivity circumstances as well as pre-set rules and thresholds. The LSSs 106 routing decisions can also be driven by commands from the CBM 102.

The connectivity circumstances of a particular MCP may include whether it has access to an alternate connection to the network (e.g., port WiFi), its location, whether it is proximate to another MCP that provides uplink bandwidth, whether it has just arrived to port or will soon depart, predicted weather patterns, passenger count and other considerations, such as:
- Bandwidth cost
- Link performance and availability
- Link latency
- MCP itinerary or course
- Bandwidth availability
- Customer preferences
- Network load balance
- Proximity to other bandwidth sources (e.g. shore-side WiFi, 3G/4G, other vessels)

Figure 2:
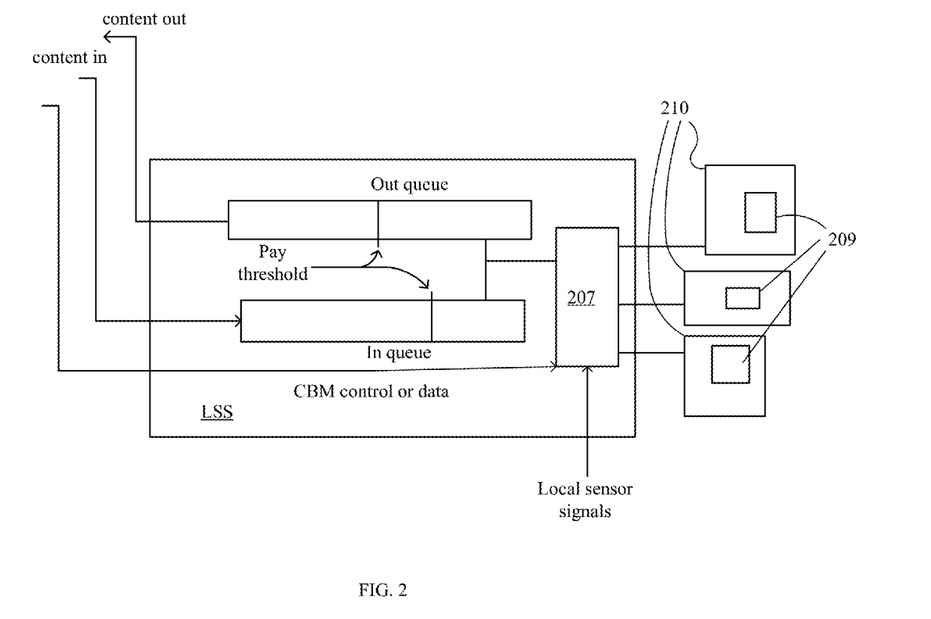
FIG. 2 illustrates an embodiment of a system for modifying application logic features in response to bandwidth conditions aboard a mobile communication platform.

FIG. 2 illustrates an embodiment of a data system for an MCP. The system modifies application logic 209 of the devices 210 of passengers on the MCP, so that previously free functions are subject to a payment model system based on bandwidth conditions, or expected bandwidth conditions, from the MCP to an external data network. The application logic 209 establishes a communication connection to control logic aboard the moving vessel. The control logic monitors factors affecting latency of communications to or from the application logic 209 to a network external to the MCP (or receives control or data related to said factors from the CBM 102). The control logic 207 modifies features of the applications 209 between free to use and a payment model for use, according to the factors affecting latency.

Input and output queues to a limited bandwidth connection, for example to a satellite, are monitored by control logic 207. The length of the queues, or some other indicia of latency or cost for data submitted for communication by the applications 209 or submitted to be received by the applications 209, is monitored by control logic 207. Connectivity circumstances may also be monitored (e.g., see supra) by sensors local to the MCP or by the CBM 102. A determination is made as to whether to apply control logic 207 to modify application logic 209 of devices 210 on board the MCP so that certain features of the applications 209 are switched from being available for free to being subject to a payment model (ore removed/disabled). This determination may be made by the control logic 207 alone, or by control logic 207 in conjunction with the CBM 102. Features that may be affected include for example transmitting or receiving photos or video over the external network connection, or receiving streamed music from the external network connection to the devices 210, or other bandwidth consuming activities of the applications 209.

Figure 3:
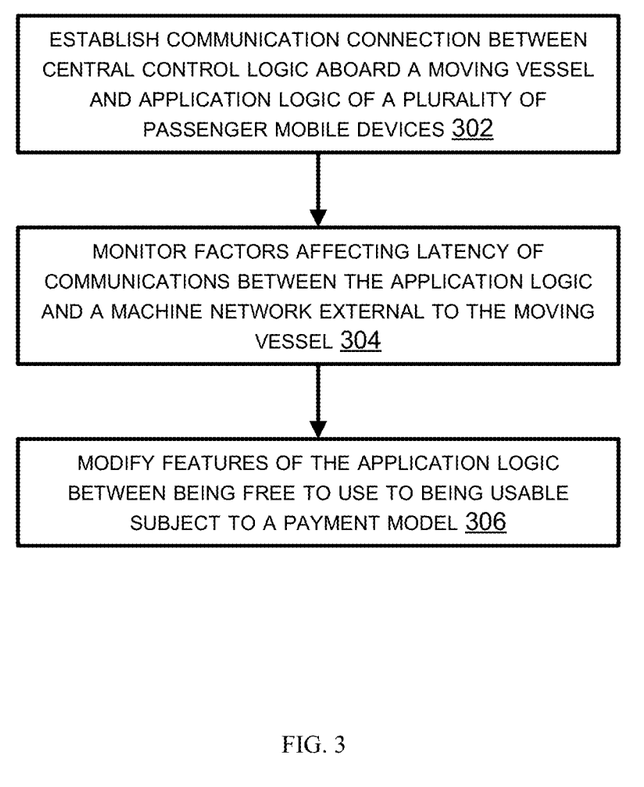
FIG. 3 is a flow chart illustrating an embodiment of a process of managing features of a plurality of application logic of passenger mobile devices aboard a moving vessel.

FIG. 3 is a flow chart illustrating an embodiment of a process of managing features of a plurality of application logic of passenger mobile devices aboard a moving vessel.

A communication connection is established between central control logic aboard a moving vessel and application logic of a plurality of passenger mobile devices (302). Factors affecting latency of communications between the application logic and a machine network external to the moving vessel are monitored (304). Features of the application logic are modified between being free to use to being usable subject to a payment model (306). For example, features of the application logic that are subject to a payment model may be modified to being usable for free, upon detection that an MCP utilizing a satellite connection for connectivity to the Internet is or will soon be within WiFi range of fixed port-side antennas, or WiFi antennas of another MCP that's trajectory will bring it within WiFi range of the MCP. The switch between paid use and free use of features may occur upon such predicted upcoming conditions, even when queues indicate a payment model for the features should be used. (See FIG. 4 and FIG. 5).

Figure 4:
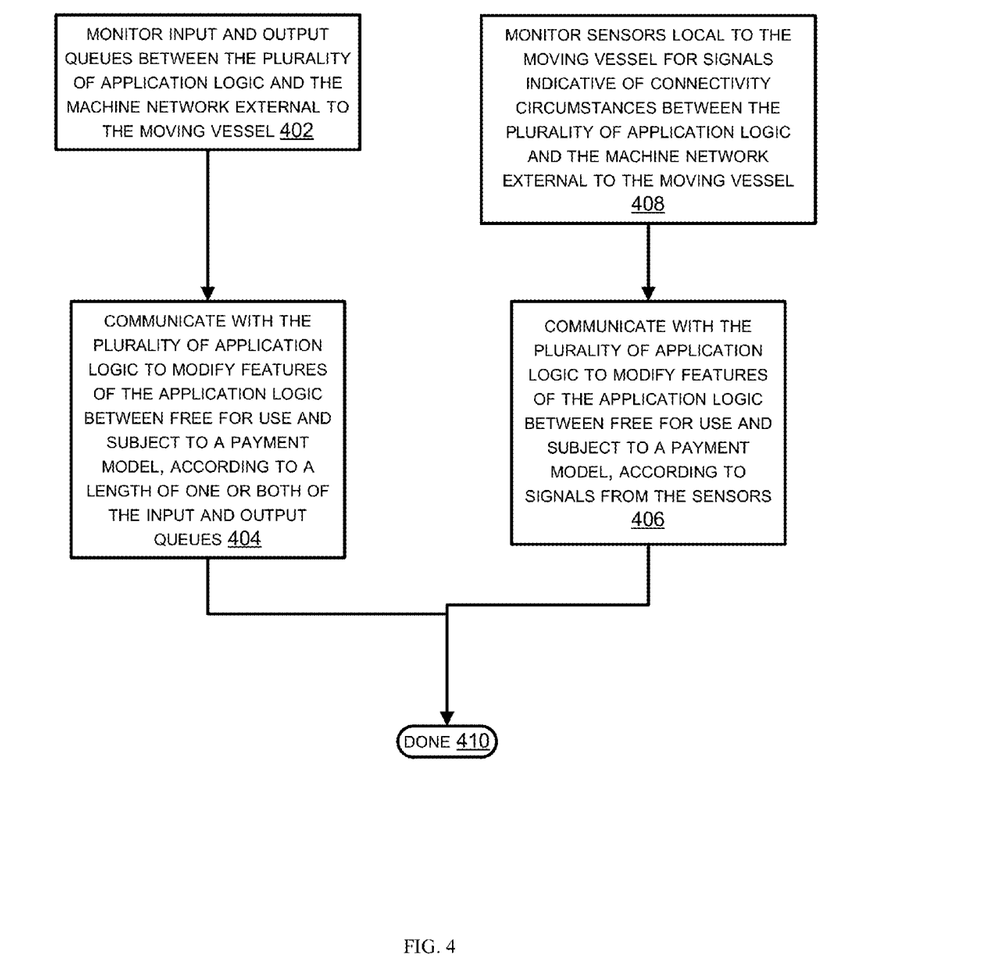
FIG. 4 is a flow chart illustrating an embodiment of a process of managing features of a plurality of application logic of passenger mobile devices aboard a moving vessel.

FIG. 4 is a flow chart illustrating an embodiment of a process of managing features of a plurality of application logic of passenger mobile devices aboard a moving vessel.

Input and output queues between the plurality of application logic and the machine network external to the moving vessel are monitored (402). Sensors local to the moving vessel are monitored for signals indicative of connectivity circumstances between the plurality of application logic and the machine network external to the moving vessel (408). Communication is carried out with the plurality of application logic to modify features of the application logic between free for use and subject to a payment model, according to a length of one or both of the input and output queues (404). In addition, or alternatively, communication is carried out with the plurality of application logic to modify features of the application logic between free for use and subject to a payment model, according to signals from the sensors (406). The process concludes (410).

Figure 5:
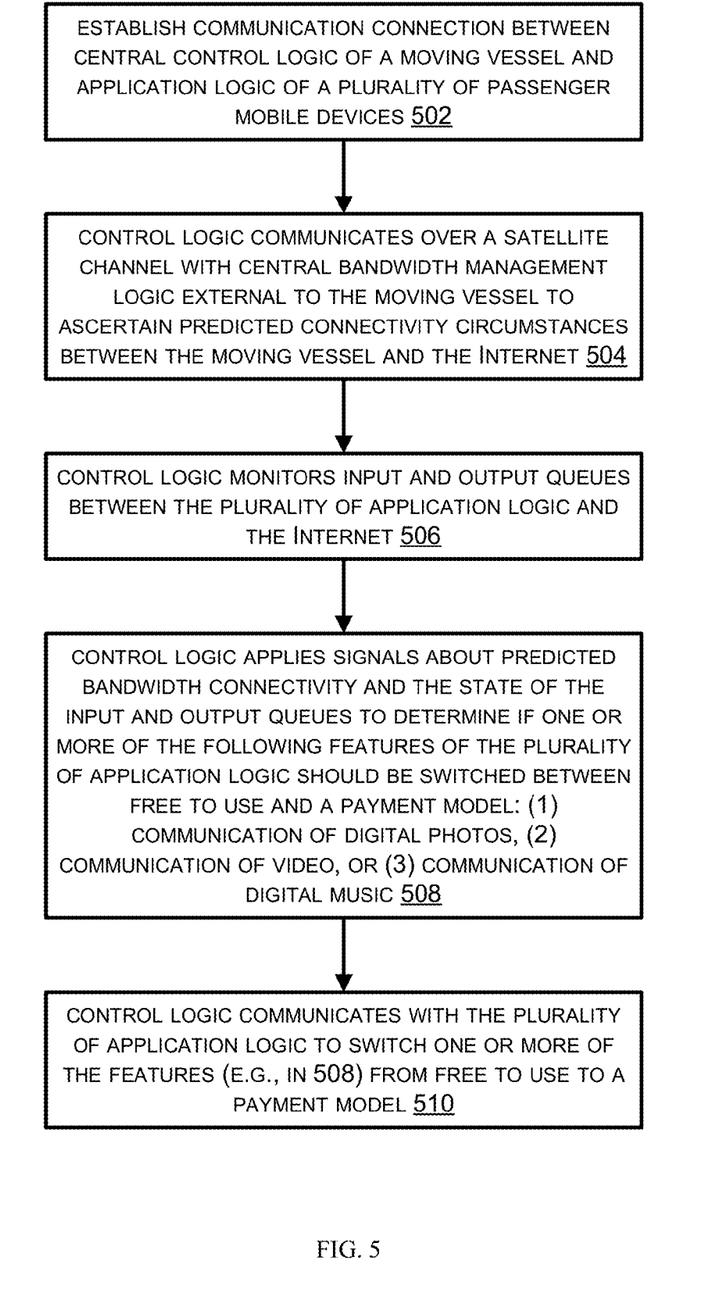
FIG. 5 is a flow chart illustrating an embodiment of a process of managing features of a plurality of application logic of passenger mobile devices aboard a moving vessel.

FIG. 5 is a flow chart illustrating an embodiment of a process of managing features of a plurality of application logic of passenger mobile devices aboard a moving vessel. A communication connection is established between central control logic of a moving vessel and application logic of a plurality of passenger mobile devices (502). The control logic communicates over a satellite channel with central bandwidth management logic external to the moving vessel to ascertain predicted connectivity circumstances between the moving vessel and the Internet (or any WAN)(504). Control logic monitors input and output queues between the plurality of application logic and the Internet (506). The control logic applies signals about predicted bandwidth connectivity and the state of the input and output queues to determine if one or more of the following features of the plurality of application logic should be switched between free to use and a payment model: (1) communication of digital photos, (2) communication of video, or (3) communication of digital music (508). The control logic communicates with the plurality of application logic to switch one or more of the features (e.g., in 508) from free to use to a payment model (510).

Figure 6:
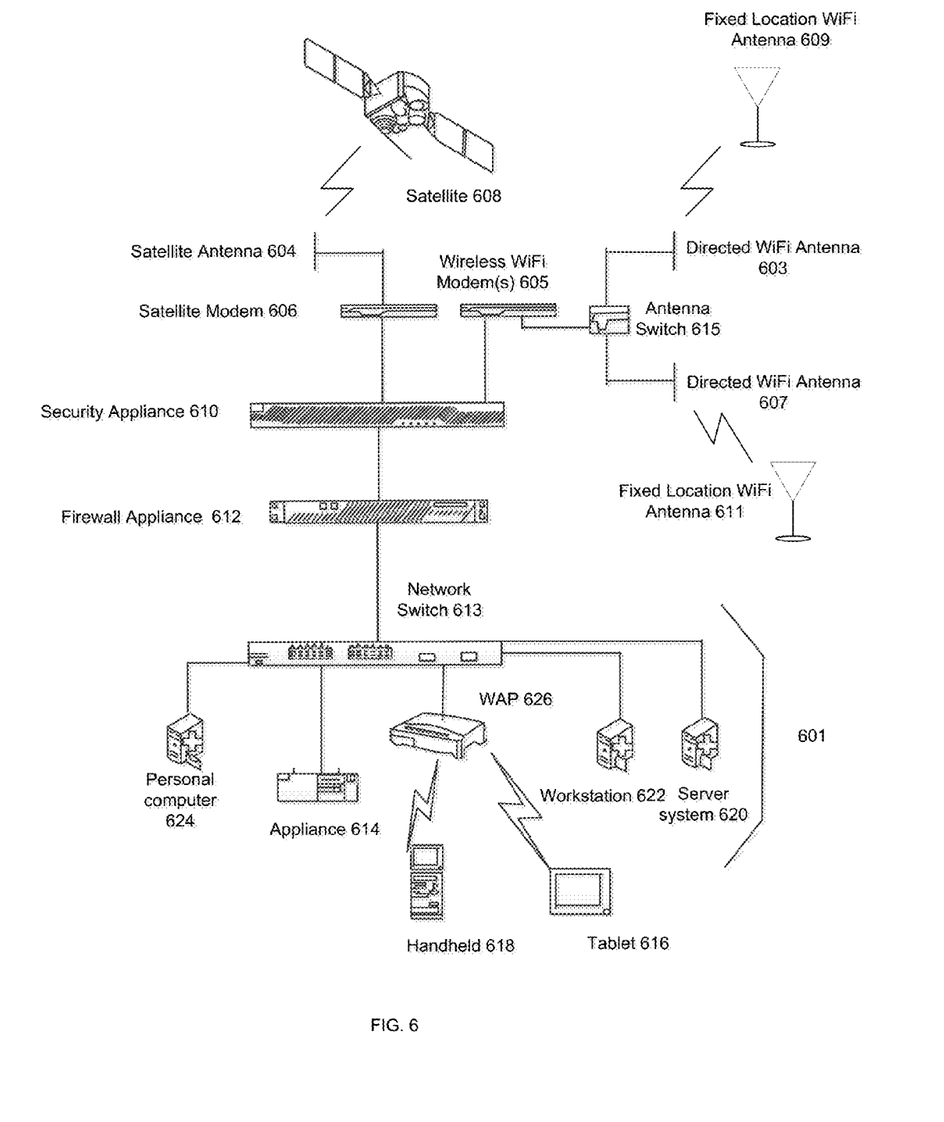
FIG. 6 illustrates an embodiment of a machine internetworking system that may be utilized to implement application logic control and priority bandwidth management as described herein.

FIG. 6 illustrates an embodiment of a machine internetworking system that may be utilized to implement application logic control as described herein. Communication is carried out between devices of a local area network (LAN) 601 and a wide area network (WAN) (e.g., the Internet) via a satellite antenna 604 and satellite 608. The LAN 601 includes server systems 620, personal computers 624, appliances 614, tablets 616, handheld (mobile) devices 618, and workstations 622. The server systems 620 may comprise control logic to modify application logic of the personal computers 624, appliances 614, tablets 616, handheld (mobile) devices 618, as described herein, and/or to manage priority bandwidth to a defined group of application logic on distinct passenger devices as described herein. A WAP 626 provides wireless access to the LAN 601. Of course, a typical LAN includes other devices as well, such as printers, faxes, scanners, etc. The networks are bridged via a system of devices including (in this example) a satellite modem 606, a security appliance 610, a firewall appliance 612, and a network switch 618. The security appliance 610 (e.g., Cisco 5510) provides, for example, firewall and VPN (virtual private network) concentration, intrusion detection, and intrusion prevention. The firewall appliance 612 (e.g., Barracuda) provides, for example, anti-virus and anti-fishing protection for the LAN 601, and web, email, and file content filtering. Communication traffic is switched between the LAN 601 and the WAN by a network switch 618. The WAN may also be accessed in some circumstances via WiFi (e.g., wireless proximity to one or more fixed location WiFi antennas 609 and 611). A WiFi 'modem' 605 may provide signals to an antenna switch 615, which in turn provides the signals to one or more directed WiFi antennas 603, 607. The signals are communicated to and from the antennas 603, 607 using WiFi to one or more fixed location WiFi antennas 609 and 611.

Figure 7:
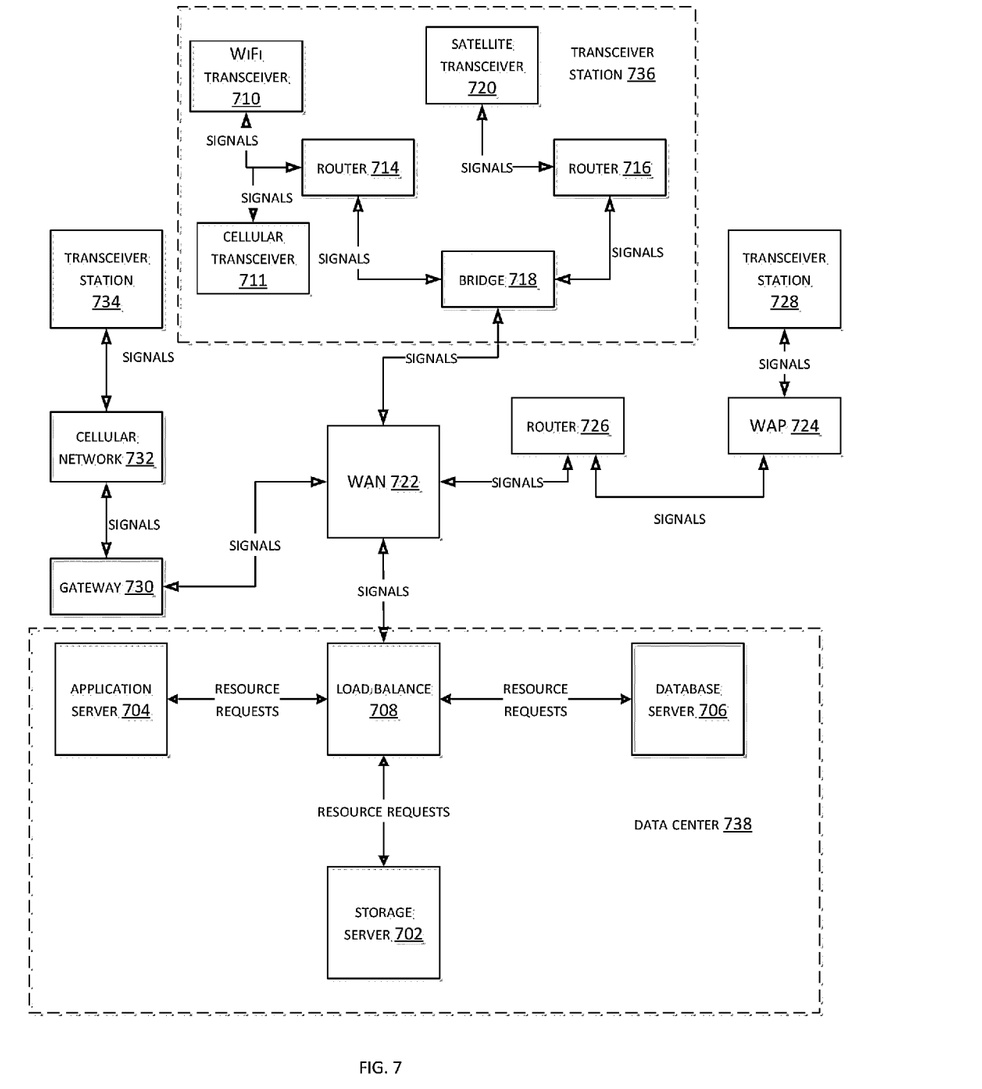
FIG. 7 illustrates an embodiment of a machine network that may be utilized to implement MCP to WAN (e.g., the Internet) communications and modification of application logic and management of priority bandwidth among a group of associated application logic as described herein.

FIG. 7 illustrates an embodiment of a machine network that may be utilized to implement MCP to WAN (e.g., the Internet) communications and modification of application logic and management of a priority bandwidth allocation among a group of associated application logic as described herein. Transceiver stations 736, 728, and 734 may utilize one or more wireless network technologies to send and receive wireless signals, including cellular transceivers 711, WiFi transceivers 710, and satellite transceivers 720. The transceiver stations 736, 728, and 734 may interface to a WAN 722 (e.g., intranet or Internet) using various machine network technologies, such as a cellular network 732, cable modem, DSL, T1, or WAP 724. Signals representing server resource requests or data transfer (e.g., images, video, music) are output from transceiver stations to the various WAN access devices, from which they are propagated to the WAN 722 and from there to a data center 738 (e.g., a CBM system). These signals are typically encoded into standard protocols such as Internet Protocol (IP), TCP/IP, and HTTP. When the clients are part of a LAN 736, the signals may be propagated via one or more router 714 716 and a bridge 718. A router 726 may propagate signals from the WAP 724 to the WAN 722. A gateway 730 may propagate signals from the cellular network 732 to the WAN 722. The server system in this example comprises a number of separate server devices, typically each implemented in the separated machine, although this is not necessarily the case. The signals from various transceiver stations are provided via a load balancing server 708 to one or more application server 704 and one or more database server 716 and one or more storage server 702. Load balancing server 708 maintains an even load distribution to the other servers, including storage server 702, application server 704, and database server 706. These server devices may cooperate to implement a CBM system, or any machine network based resource or application as described herein. Each server in the drawing may represent in effect multiple servers of that type. The signals applied to the database server 706 may cause the database server 706 to access certain memory addresses, which correlates to certain rows and columns in a memory device. The data center 738 may thus be implemented as devices coordinated on a LAN, or over a wide geographical area utilizing a WAN or cellular network, or over a limited area (room or house or store/bar) utilizing a WAP. A CBM in this system be implemented, for example, as an application (app) on a corporate LAN. The data center 738 and associated transceiver stations 736, 728, 734 may be implemented as a pure or hybrid peer to peer system in a local or widely distributed area.

Figure 8:
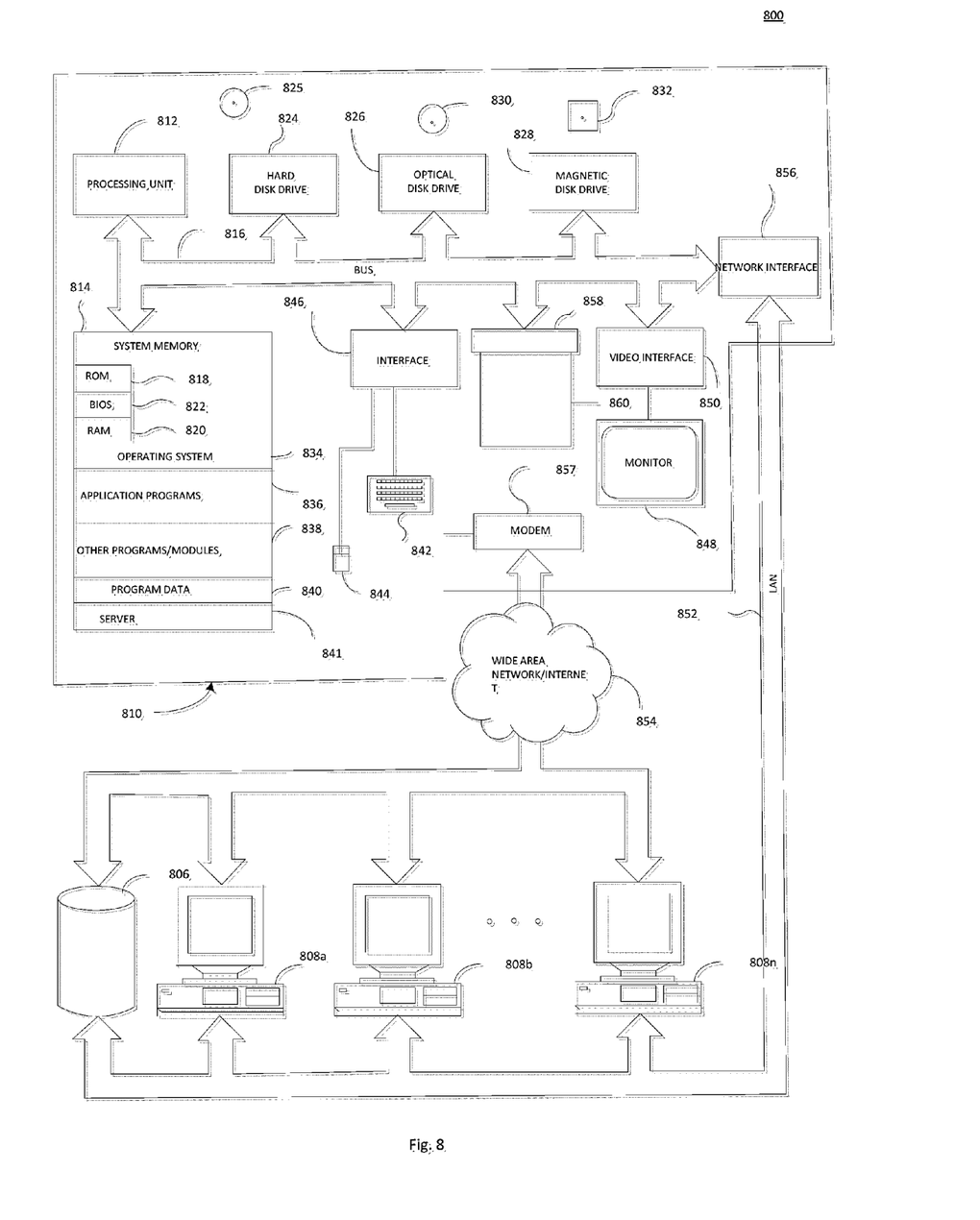
FIG. 8 illustrates an embodiment of a computer system machine and a machine communication network.

FIG. 8 illustrates an embodiment of a computer system machine and a machine communication network. The computer system 800 may implement a server system 620, a passenger device (e.g., PC, laptop, tablet, iPod, etc.), or any server as described herein. Many of the features of the computer system 800 will also be found in mobile phones. A particular computer system 800 of the machine network may include one or more processing units 812a, 812b (collectively 812), a system memory 814 and a system bus 816 that couples various system components including the system memory 814 to the processing units 812. The processing units 812 may be any logic processing unit, such as one or more central processing units (CPUs) 812a, digital signal processors (DSPs) 812b, application-specific integrated circuits (ASICs), field programmable gate arrays (FPGAs), etc. The system bus 816 can employ any known bus structures or architectures, including a memory bus with memory controller, a peripheral bus, and a local bus. The system memory 814 includes read-only memory (ROM) 818 and random access memory (RAM) 820. A basic input/output system (BIOS) 822, which can form part of the ROM 818, contains basic routines that help transfer information between elements within the computer system 800, such as during start-up.

The computer system 800 may also include a plurality of interfaces such as network interface 860, interface 850 supporting modem 862 or any other wireless/wired interfaces.

The computer system 800 may include a hard disk drive 824 for reading from and writing to a hard disk 826, an optical disk drive 828 for reading from and writing to removable optical disks 832, and/or a magnetic disk drive 830 for reading from and writing to magnetic disks 834. The optical disk 832 can be a CD-ROM, while the magnetic disk 834 can be a magnetic floppy disk or diskette. The hard disk drive 824, optical disk drive 828 and magnetic disk drive 830 may communicate with the processing unit 812 via the system bus 816. The hard disk drive 824, optical disk drive 828 and magnetic disk drive 830 may include interfaces or controllers (not shown) coupled between such drives and the system bus 816, as is known by those skilled in the relevant art. The drives 824, 828 and 230, and their associated computer-readable storage media 826, 832, 834, may provide non-volatile and non-transitory storage of computer readable instructions, data structures, program modules and other data for the computer system 800. Although the depicted computer system 800 is illustrated employing a hard disk 824, optical disk 828 and magnetic disk 830, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 812a.

Program modules can be stored in the system memory 814, such as an operating system 836, one or more application programs 838, other programs or modules 840 and program data 842. Application programs 838 may include instructions that cause the processor(s) 812 to automatically provide dynamic selection of data and telecommunication service providers before or during communications between various devices such as, for example, a mobile device and a landline telephone. Other program modules 840 may include instructions for handling security such as password or other access protection and communications encryption. The system memory 814 may also include communications programs, for example, a Web client or browser 844 for permitting the computer system 800 to access and exchange data with sources such as Web sites of the Internet, corporate intranets, extranets, or other networks and devices as described herein, as well as other server applications on server computing systems. The browser 844 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 814, the operating system 836, application programs 838, other programs/modules 840, program data 842 and browser 844 can be stored on the hard disk 826 of the hard disk drive 824, the optical disk 832 of the optical disk drive 828 and/or the magnetic disk 834 of the magnetic disk drive 830.

An operator can enter commands and information into the computer system 800 through input devices such as a touch screen or keyboard 846 and/or a pointing device such as a mouse 848, and/or via a graphical user interface. Other input devices can include a microphone, joystick, game pad, tablet, scanner, etc. These and other input devices are connected to one or more of the processing units 812 through an interface 850 such as a serial port interface that couples to the system bus 816, although other interfaces such as a parallel port, a game port or a wireless interface or a universal serial bus (USB) can be used. A monitor 852 or other display device is coupled to the system bus 816 via a video interface 254, such as a video adapter. The computer system 800 can include other output devices, such as speakers, printers, etc.

The computer system 800 can operate in a networked environment using logical connections to one or more remote computers and/or devices. For example, the computer system 800 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

IMPLEMENTATIONS AND ALTERNATIVES

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A process for modifying application logic of passenger devices aboard a moving vessel, comprising:
    establishing a communication connection between the application logic of passenger devices and non-transitory control logic aboard the moving vessel central to all of the passenger devices;
    the non-transitory control logic aboard the moving vessel central to all of the passenger devices monitoring factors predicting future latency of communications to or from the application logic of passenger devices to a network external to the moving vessel;
    the non-transitory control logic aboard the moving vessel central to all of the passenger devices modifying features of the application logic of passenger devices to change between a free to use model and a pay to use model for use of the features of the application logic of passenger devices, according to the factors predicting future latency of communications; and
    the non-transitory control logic aboard the moving vessel central to all of the passenger devices modifying between the free to use model and the pay to use model only features of the application logic having group association on multiple of the passenger devices, the group association configured in the non-transitory control logic aboard the moving vessel central to all of the passenger devices.

2. The process of claim 1, further comprising:
    the non-transitory control logic aboard the moving vessel central to all of the passenger devices centrally accessible to the application logic of passenger devices; and
    the non-transitory control logic aboard the moving vessel central to all of the passenger devices receiving the factors predicting future latency of communications over a satellite channel from a central bandwidth manager for multiple other moving vessels.

3. The process of claim 1, further comprising:
    the non-transitory control logic aboard the moving vessel central to all of the passenger devices monitoring a state of input and output queues to the network external to the moving vessel; and
    the non-transitory control logic aboard the moving vessel central to all of the passenger devices communicating with the application logic of passenger devices to modify the features of the application logic of passenger devices to change between the free to use model and the pay to use model for use of the features of the application logic of passenger devices, according to the state of input and output queues.

4. The process of claim 3, further comprising:
    the non-transitory control logic aboard the moving vessel central to all of the passenger devices communicating with the application logic of passenger devices to modify the features of the application logic of passenger devices to change between the free to use model and the pay to use model for use of the features of the application logic of passenger devices, according to a length of one or both of the input and output queues.

5. The process of claim 3, further comprising:
    the non-transitory control logic aboard the moving vessel central to all of the passenger devices monitoring sensors local to the moving vessel to ascertain the factors predicting future latency of communications; and
    the non-transitory control logic aboard the moving vessel central to all of the passenger devices communicating with the application logic of passenger devices to modify the features of the application logic of passenger devices to change between the free to use model and the pay to use model for use of the features of the application logic of passenger devices, according to the factors predicting future latency of communications.

6. The process of claim 1, further comprising:
    applying the non-transitory control logic aboard the moving vessel central to all of the passenger devices to modify the features of the application logic of passenger devices so that a first subset of the features of the application logic of passenger devices are switched from the free to use model to the pay to use model and a second subset of the features of the application logic of passenger devices are switched from being available to unavailable from the application logic of passenger devices.

7. The process of claim 6, further comprising:
    a determination as to whether or not to apply the control logic aboard the moving vessel to modify the features of the application logic of passenger devices performed exclusively by the non-transitory control logic aboard the moving vessel central to all of the passenger devices.

8. The process of claim 7, further comprising:
    the determination as to whether or not to apply the control logic aboard the moving vessel to modify the features of the application logic of passenger devices made by the non-transitory control logic aboard the moving vessel central to all of the passenger devices cooperating over a satellite channel with a central bandwidth manager for multiple other moving vessels.

9. The process of claim 1, further comprising modifying one or more of the following of the features of the application logic having group association on multiple of the passenger devices according to the factors predicting future latency of communications:
    (a) transmitting or receiving digital photos over the network external to the moving vessel;
    (b) transmitting or receiving streamed digital video over the network external to the moving vessel; and
    (c) transmitting or receiving streamed digital music over the network external to the moving vessel.

10. A data processing system, comprising:
    central non-transitory control logic aboard a moving vessel adapted to associate a group of distinct and disparate application logic on different passenger devices aboard the moving vessel with a single account;
    the central non-transitory control logic adapted to allocate priority bandwidth on a wireless access channel from the moving vessel to a machine network external to the vessel, and to associate the priority bandwidth exclusively with the group of distinct and disparate application logic on different passenger devices; and the central non-transitory control logic adapted to set a pro-rata allocation of the priority bandwidth among different applications of the group of distinct and disparate application logic on different passenger devices in response to application activity taking place aboard the moving vessel.

11. The data processing system of claim 10, the group of distinct and disparate application logic on different passenger devices comprising application logic installed on one or more of cell phones, laptop computers, and music players.

12. The data processing system of claim 10, each distinct application of the group of distinct and disparate application logic on different passenger devices identified by a passenger device identifier and an application identifier.

13. The data processing system of claim 10, each distinct application of the group of distinct and disparate application logic on different passenger devices identified by a unique application identifier uniquely generated for the distinct application of the group of distinct and disparate application logic on different passenger devices and a passenger device of the passenger devices that it is installed upon.

14. The data processing system of claim 10, the logic adapted to allocate the priority bandwidth adapted to allocate all of the priority bandwidth entirely to one application of the group of distinct and disparate application logic on different passenger devices in response to existing or predicted connectivity circumstances for the moving vessel.

15. The data processing system of claim 10, the logic adapted to allocate the priority bandwidth adapted to allocate the priority bandwidth pro-rata by bandwidth consumption to all applications of the group of distinct and disparate application logic on different passenger devices in response to existing or predicted connectivity circumstances for the moving vessel.

16. The data processing system of claim 10, the logic adapted to allocate the priority bandwidth adapted to allocate the priority bandwidth pro-rata by bandwidth consumption to a defined subset of applications of the group of distinct and disparate application logic on different passenger devices in response to existing or predicted connectivity circumstances between the moving vessel and the machine network external to the vessel.

17. The data processing system of claim 10, further comprising:

logic adapted to modify an availability of or a payment model for features of the application logic of passenger devices in response to available or predicted bandwidth between the moving vessel and the machine network external to the vessel.

18. The data processing system of claim 10, further comprising:

logic adapted to modify an availability of or a payment model for only features of one or more application of the group of distinct and disparate application logic on different passenger devices in response to available or predicted bandwidth between the moving vessel and the machine network external to the vessel.

19. A machine system, comprising:

non-transitory logic to establish a wireless communication connection between application logic of passenger devices aboard a moving vessel, and non-transitory control logic aboard the moving vessel central to all of the passenger devices;

the non-transitory control logic aboard the moving vessel central to all of the passenger devices monitoring factors predicting future availability of WiFi communications between the moving vessel and a machine network external to the moving vessel;

the non-transitory control logic aboard the moving vessel central to all of the passenger devices comprising logic to modify features of the application logic of passenger devices to change between a free to use model and a pay to use pay to use model for use of the features of the application logic of passenger devices in response to the factors predicting future availability of WiFi communications; and the features of the application logic of passenger devices that is modified being a subset of application logic in a defined group of associated application logic on different passenger devices.

* * * * *